United States Patent Office 3,517,028
Patented June 23, 1970

3,517,028
1-BENZOYL-2-METHYL-3-INDOLYLACETIC
ACID DERIVATIVES
John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,024
Int. Cl. C07d 27/56
U.S. Cl. 260—326.16       3 Claims

ABSTRACT OF THE DISCLOSURE

The invention relates to novel 1-p-chlorobenzoyl-2-methyl-3-indolyl methanol or 3-indolyl halomethyl compounds. These compounds are useful in the preparation of potent anti-inflammatory products.

This invention relates to a method of preparing certain 1-benzoyl-2-methyl-3-indolylacetic acid derivatives. More particularly, it relates to a method of preparing 1-p-chlorobenzoyl-2-methyl-3-indolylacetic acids of the formula

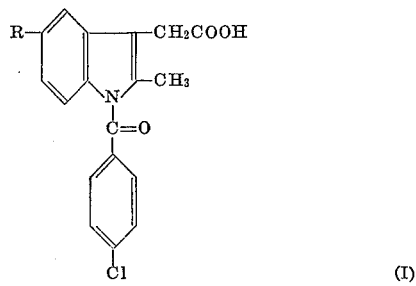

(I)

wherein R is methoxy or dimethylamino. These compounds are disclosed and claimed in U.S. Pat. 3,161,654, issued Dec. 15, 1964, to Shen. It relates further to the provision of new intermediates useful in the above method.

In the Shen patent, 1-p-chlorobenzoyl-2-methyl-3-indolylacetic acids are prepared by a series of reactions in which a 2-methyl-3-indolylacetic acid is dehydrated to the corresponding anhydride. The anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new method and new intermediates for obtaining these compounds.

It has now been discovered in accordance with the present invention that the compounds of Formula I can be prepared by a carbonylation reaction in which a compound of the Formula II:

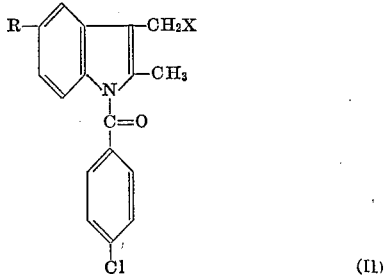

(II)

wherein R is as defined above and X is halo (such as chloro, bromo or iodo) or hydroxy, is converted in the presence of a catalyst to the 3-acetic acid derivative.

The carbonylation reaction of this invention is accomplished by means of carbon monoxide. Since the reactant is a gas, it is desirable to conduct the reaction under superatmospheric pressure. Conventional high-pressure equipment capable of taking the reaction pressures of about 100 to 5,000 p.s.i. can be used as the reaction vessel. The reaction can be effected at atmospheric pressures by bubbling the carbon monoxide through a solution of the starting material. The reaction proceeds with facility at temperatures in the range of 100° to 400° C. Temperatures in the middle area of the range are preferred.

To catalyze the carbonylation reaction of the present invention, a wide variety of materials can be used. Among the suitable materials there can be named boron trifluoride, hydrochloric acid, alkali metal chlorides, copper, nickel, cobalt oxides and oxides and salts of elements of Groups 3–6 in the Periodic System. Among the suitable salts of these elements are the chlorides, phosphates and molybdates. The preferred catalyst systems are nickel tetracarbonyl, nickel chloride, and boron trifluoride.

To practice the present invention, the starting material, whether it be the 3-hydroxymethylindole (X=hydroxy) or the 3-halomethylindole (X=halo) and water, along with the catalyst, is placed in a reaction vessel, and carbon monoxide, at the desired pressure, is introduced. Heat is applied so that the reaction mixture reaches a temperature as above noted, and the reaction is allowed to proceed for a time sufficient to allow carbonylation, e.g., 4–12 hours. The reaction mixture is then cooled. The gases are released if superatmospheric pressures were employed, and the contents of the reaction vessel are extracted with a solvent for the product. Suitable solvents are halogenated aliphatic hydrocarbons such as methylene chloride, ethylene chloride, and the like. The product can be obtained in rather pure form by washing the extract to neutrality with water and then concentrating the extract to dryness. The solid residue is the desired product. It can be obtained in still purer form by recrystallization from an alkanol such as t-butanol.

The starting materials for use in the carbonylation process of the present invention are prepared in accordance with the following reaction scheme wherein R is as defined above:

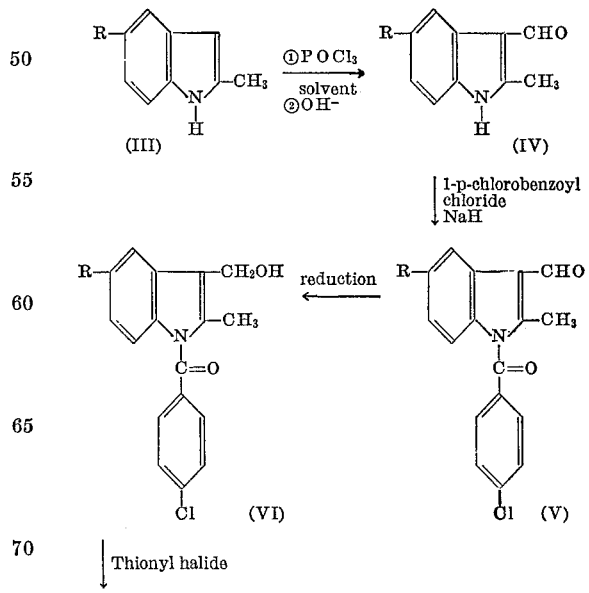

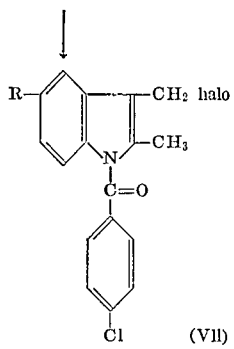

(VII)

The following examples are presented to further illustrate the present invention.

EXAMPLE 1

Preparation of 1-p-chlorobenzoyl-2-methyl-5-methoxy-3-indolyl-methanol (A) 2-methyl - 5 - methoxyindole-3-carboxaldehyde.—Into a 100 ml. flask, 36.5 g. of anhydrous dimethylformamide is charged and cooled to −5° C. Phosphorus oxychloride (15.34 g.) is added dropwise at −5° C. to 0° C. After completion of addition, 8.05 g. of 2-methyl-5-methoxyindole is added portion-wise at 20° to 25° C. After aging for one hour at room temperature, 20 g. of dry calcium carbonate is added; and the reaction mixture is heated to 60° C. over a one-hour period. The mixture is then cooled to 10° C. and quenched into 100 ml. of 30% sodium-acetate solution, followed by dilution with water to 500 ml. After addition of 20 g. of sodium hydroxide, the mixture is refluxed for two hours and cooled to 10° C. The solid is filtered, washed with water and dried in vacuo.

(B) 1 - p - chlorobenzoyl - 2 - methyl - 5 - methoxy-indole-3-carboxaldehyde.—To a slurry of 4.8 g. sodium hydride (50% oil emulsion) in 25 ml. of anhydrous dimethylformamide is added 18.92 g. of 2-methyl-5-methoxyindole-3-carboxaldehyde in 50 ml. of anhydrous dimethylformamide at 10° C. with good stirring. The reaction mixture is aged for one hour to complete the N-sodium salt formation. 18.0 g. of p-chlorobenzoyl chloride is added dropwise maintaining the temperature between 0° and 10° C. After the addition is completed, the mixture is aged at 20–25° C. for four hours, then quenched in 300 ml. of ice-cold water containing 10 ml. of acetic acid. The precipitated solid is filtered, washed with water and dried in vacuo.

(C) 1 - p - chlorobenzoyl - 2 - methyl - 5 - methoxyindole-3-methanol.—Ten grams of 1-p-chlorobenzoyl-2-methyl-5-methoxyindole-3-carboxaldehyde is suspended in 25 ml. of glacial acetic acid. A solution of 2.5 g. of dimethylborane in 20 ml. of glacial acetic acid is added dropwise to the aldehyde suspension. After the addition is complete, the reaction mixture is heated under reflux for 10 minutes and allowed to cool. 6.0 ml. of cold water is added and the precipitated 1-p-chlorobenzoyl-2-methyl-5-methoxyindole-3-methanol is filtered, washed with cold water and dried in vacuo.

EXAMPLE 2

Preparation of 1-p-chlorobenzoyl-2-methyl-5-dimethylamino-3-indolylmethanol (A) 2 - methyl - 5 - dimethylamino - indole - 3 - carboxaldehyde.—Into a 100 ml. flask, 36.5 g. of anhydrous dimethylformamide is charged and cooled to −5° C. Phosphorus oxychloride (15.34 g.) is added dropwise at −5° C. to 0° C. After completion of addition, 0.06 g. of 2-methyl-5-dimethylamino-indole is added portion-wise at 20° to 25° C. After aging for one hour at room temperature, 20 g. of dry calcium carbonate is added and the reaction mixture is heated to 60° C. over a one-hour period. The mixture is then cooled to 10° C. and quenched into 100 ml. of 30% sodium acetate solution, followed by dilution with water to 500 ml. After addition of 20 g. of sodium hydroxide, the mixture is refluxed for two hours and cooled to 10° C. The solid is filtered, washed with water and dried in vacuo.

(B) 1 - p - chlorobenzoyl - 2 - methyl - 5 - dimethylaminoindole-3-carboxaldehyde.—To a slurry of 4.8 g. sodium hydride (50% oil emulsion) in 25 ml. of anhydrous dimethylformamide is added 17.5 g. of 2-methyl-5-dimethylaminoindole-3-carboxaldehyde in 50 ml. of anhydrous dimethylformamide at 10° C. with good stirring. The reaction mixture is aged for one hour to complete the N-sodium salt formation. 18.0 g. of p-chlorobenzoyl chloride is added dropwise maintaining the temperature between 0° and 10° C. After the addition is completed, the mixture is aged at 20–25° C. for 4 hours, then quenched in 300 ml. of ice-cold water. The precipitated solid is filtered, washed with water and dried in vacuo.

(C) 1 - p - chlorobenzoyl - 2 - methyl - 5 - dimethylaminoindole - 3 - methanol. — 1 - p - chlorobenzoyl - 2-methyl-5-dimethylaminoindole-3-carboxaldehyde (9.2 g.) is suspended in 25 ml. of glacial acetic acid. A solution of 2.5 g. of dimethylborane in 20 ml. of glacial acetic acid is added dropwise to the aldehyde suspension. After the addition is completed, the reaction mixture is heated under reflux for 10 minutes and allowed to cool. 6.0 ml. of cold water is added; the pH of the mixture is adjusted to 7.0–7.5; and the precipitated 1-p-chlorobenzoyl-2-methyl-5-dimethylaminoindole-3-methanol is filtered, washed with cold water and dried in vacuo.

EXAMPLE 3

Preparation of 1-p-chlorobenzoyl-2-methyl-5-methoxy-3-bromomethylindole

Into a 50 ml. three-necked flask, 3.17 g. of 1-p-chlorobenzoyl-2-methyl-5-methoxy-3-indolylmethanol, 3 g. of dry calcium carbonate and 30 ml. of anhydrous benzene are charged.

Thionylbromide (12.8 g.) is added with stirring over 20 minutes; then the reaction mixture is heated to 40° C. for 30 minutes. The inorganic salts are filtered; the cake is washed with benzene; and the combined extracts and washes are washed with water and dried over MgSO$_4$. After removal of the solvent, 1-p-chlorobenzoyl-2-methyl-5-methoxy-3-bromomethylindole is obtained. Recrystallization from t-butanol affords the product in pure form.

EXAMPLE 4

Preparation of 1-p-chlorobenzoyl-2-methyl-5-dimethylamino-3-bromomethylindole

Into a 50 ml. three-necked flask, 2.90 g. of 1-p-chlorobenzoyl - 2 - methyl - 5 - dimethylamino - 3 - indolylmethanol, 3 g. of dry calcium carbonate and 30 ml. of anhydrous benzene are charged. Thionylbromide (12.8 g.) is added with stirring over 20 minutes; then the reaction mixture is heated to 40° C. for 30 minutes. The inorganic salts are filtered; the cake is washed with benzene; and the combined extracts and washes are washed with water and dried over MgSO$_4$. After removal of the solvent, the residue is recrystallized from t-butanol to give 1-p-chlorobenzoyl-2-methyl-5-dimethylamino-3-bromomethylindole.

EXAMPLE 5

Preparation of 1-p-chlorobenzoyl-2-methyl-5-methoxy-3-chloromethylindole

Into a 500 ml. flask, 31.77 g. of 1-p-chlorobenzoyl-2-methyl-5-methoxyindole-3-methanol, 30 g. dry calcium carbonate and 300 ml. of anhydrous benzene are charged. Thionylchloride (11.9 g.) is added with stirring over 30 minutes, then the reaction mixture is heated to 40° C. for 30 minutes. The inorganic salts are filtered; the cake is washed with 25 ml. of benzene. The combined filtrate and washes are washed with 50 ml. of water twice, dried over sodium sulfate and the solvent is removed in vacuo to give 1-p-chlorobenzoyl-2-methyl-5-methoxy-3-chloromethylindole. Recrystalliation from t-butanol gave the product in pure form.

EXAMPLE 6

Preparation of 1-p-chlorobenzoyl-2-methyl-5-dimethylamino-3-chloromethylindole

Into a 500 ml. flask, 31.77 g. of 1-p-chlorobenzoyl-2-methyl-5-dimethylaminoindole-3-methanol, 30 g. dry calcium carbonate and 300 ml. of anhydrous benzene are charged. Thionylchloride (11.9 g.) is added with stirring over 30 minutes, then the reaction mixture is heated to 40° C. for 30 minutes. The inorganic salts are filtered; the cake is washed with 25 ml. of benzene. The combined filtrate and washes are washed twice with 50 ml. of water, dried over sodium sulfate and the solvent is removed in vacuo. The residue is recrystallized from t-butanol to give pure 1-p-chlorobenzoyl-2-methyl-5-dimethylamino-3-chloromethylindole.

EXAMPLE 7

Preparation of 1-p-chlorobenzoyl-2-methyl-5-methoxy-3-indolylacetic acid

1 - p - chlorobenzoyl - 2 - methyl - 5 - methoxyindole-3-methanol (3.3 g.), water (0.3 g.), nickel tetracarbonyl (0.8 g.), nickel chloride (0.2 g.) and concentrated hydrochloric acid (0.3 ml.) are placed in the glass liner of a 20 ml. capacity stainless steel autoclave and carbon monoxide at a pressure of 900 p.s.i. is introduced. The mixture is heated at 200° C. for 10 hours. After cooling to room temperature, the gases are released and the content is extracted with methylene chloride. The methylene chloride extract is washed to neutrality with water, dried over magnesium sulfate and concentrated to dryness. The solid residue is recrystallized from t-butanol to give 1-p-chlorobenzoyl-2-methyl-5-methoxy-3-indolylacetic acid.

EXAMPLE 8

Preparation of 1-p-chlorobenzoyl-2-methyl-5-dimethylamino-3-indolylacetic acid

1 - p - chlorobenzoyl - 2 -methyl - 5 - dimethylamino - 3-indolylmethanol (3.2 g.), water (0.3 g.), nickel tetracarbonyl (0.8 g.), nickel chloride (0.2 g.) and concentrated hydrochloric acid (0.3 ml.) are placed in the glass liner of a 20 ml. capacity stainless steel autoclave and carbon monoxide at a pressure of 900 p.s.i. is introduced. The mixture is heated at 200° C. for 10 hours. After cooling to room temperature, the gases are released and the content is extracted with methylene chloride. The methylene chloride extract is washed to neutrality with water, dried over magnesium sulfate and concentrated to dryness. The solid residue is recrystallized from t-butanol to give 1-p-chlorobenzoyl - 2 - methyl - 5 - dimethylamino - 3 - indolylacetic acid.

EXAMPLE 9

Preparation of 1-p-chlorobenzoyl-2-methyl-5-methoxy-3-indolylacetic acid

1 - p - chlorobenzoyl - 2 - methyl - 5 - methoxy - 3 - indolylmethanol (5.0 g.) and carbon tetrachloride (50 ml.) are placed in a stainless steel autoclave. One ml. of boron trifluoride is introduced to a pressure of 4–5 atmospheres, then carbon monoxide is added at a pressure of 600 atmospheres. The reaction mixture is shaken at room temperature at the same carbon monoxide pressure for 9 hours. The gasses are released and the carbon tetrachloride solution is washed with water. After removal of the solvent, the product 1-p-chlorobenzoyl-2-methyl-5-methoxy-3-indolylacetic acid is recrystallized from t-butanol.

EXAMPLE 10

Preparation of 1-p-chlorobenzoyl-2-methyl-5-dimethylamino-3-indolylacetic acid 1-p-chlorobenzoyl-2-methyl-5-dimethylamino-3-indolylmethanol (4.8 g.), and carbon tetrachloride (50 ml.) are placed in a stainless steel autoclave. One ml. of boron trifluoride is introduced to a pressure of 4–5 atmospheres, then carbon monoxide is added at a pressure of 600 atmospheres. The reaction mixture is shaken at room temperature at the same carbon monoxide pressure for 9 hours. The gases are released and the carbon tetrachloride solution is washed with water. After removal of the solvent, the product 1-p-chlorobenzoyl-2-methyl-5-dimethylamino-3-indolylacetic acid is recrystallized from t-butanol.

EXAMPLE 11

Preparation of 1-p-chlorobenzoyl-2-methyl-5-methoxy-3-indolylacetic acid 1-p-chlorobenzoyl-2-methyl-5-methoxy-3 - chloromethyl indole (3.5 g.), water (0.8 g.), n-butyl acetate (15 ml.), nickel iodide (0.3 g.) and finely powdered nickel (0.2 g.) are charged into a 50 ml. capacity steel autoclave. Carbon monoxide at a pressure of 250 atmospheres is introduced and the autoclave is heated at 150° C. for 8 hours. After cooling to room temperature, the gases are released and the product is isolated by extraction with methylene chloride. The methylene chloride extracts are washed with water to neutrality, dried over magnesium sulfate and concentrated to dryness. The residue after crystallization from t-butanol gives pure 1-p-chlorobenzoyl-2-methyl-5-methoxy-3-indolylacetic acid.

EXAMPLE 12

Preparation of 1-p-chlorobenzoyl-2-methyl-5-dimethylamino-3-indolylacetic acid 1-p-chlorobenzoyl-2-methyl-5-dimethylamino-3 - chloromethyl indole (3.3 g.), water (0.8 g.), n-butyl acetate (15 ml.), nickel iodide (0.3 g.) and finely powdered nickel (0.2 g.) are charged into a 50 ml. capacity steel autoclave. Carbon monoxide at a pressure of 250 atmospheres is introduced and the autoclave is heated at 150° C. for 8 hours. After cooling to room temperature, the gases are released and the product is isolated by extraction with methylene chloride. The methylene chloride extracts are washed with water to neutrality, dried over magnesium sulfate and concentrated to dryness. The residue after crystallization from aqueous ethanol gives pure 1-p-chloro-benzoyl-2-methyl-5-dimethylamino-3 - indolylacetic acid.

What is claimed is:
1. A compound of the formula:

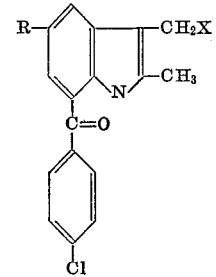

wherein R is methoxy or dimethylamino and X is halogen or hydroxy.
2. The compounds of claim 1 wherein R is methoxy.
3. The compounds of claim 1 wherein X is chloro, bromo or iodo.

References Cited

FOREIGN PATENTS 6508553    1/1966    Netherlands.

ALEX MAZEL, Primary Examiner

J. A. NARCAVAGE, Assistant Examiner

U.S. Cl. X.R.

260—326.15, 999